Nov. 9, 1965 J. CHOLET 3,216,637

DEVICE FOR AUTOMATICALLY CONTROLLING THE FEEDING OF A MAGNETIC TAPE

Filed April 1, 1963 5 Sheets-Sheet 1

INVENTOR

JACQUES CHOLET

BY Toulmin & Toulmin

ATTORNEYS

INVENTOR
JACQUES CHOLET

INVENTOR
JACQUES CHOLET
BY Toulmin & Toulmin
ATTORNEYS

Nov. 9, 1965 J. CHOLET 3,216,637

DEVICE FOR AUTOMATICALLY CONTROLLING THE FEEDING OF A MAGNETIC TAPE

Filed April 1, 1963 5 Sheets-Sheet 4

INVENTOR

JACQUES CHOLET

BY Toulmin & Toulmin

ATTORNEYS

Nov. 9, 1965 J. CHOLET 3,216,637

DEVICE FOR AUTOMATICALLY CONTROLLING THE FEEDING OF A MAGNETIC TAPE

Filed April 1, 1963 5 Sheets-Sheet 5

INVENTOR

JACQUES CHOLET

BY Toulmin & Toulmin

ATTORNEYS

United States Patent Office 3,216,637

Patented Nov. 9, 1965

3,216,637
DEVICE FOR AUTOMATICALLY CONTROLLING THE FEEDING OF A MAGNETIC TAPE

Jacques Cholet, Rueil-Malmaison, France, assignor to Institut Francais du Petrole, des Carburants et Lubrifiants, Rueil-Malmaison, France Filed Apr. 1, 1963, Ser. No. 269,291
Claims priority, application France, Apr. 6, 1962, 893,714; July 18, 1962, 904,417
4 Claims. (Cl. 226—30)

This invention relates to a device for the automatic control of the feeding of a magnetic tape, particularly of the type for seismic recording.

Seismic recordings on magnetic tapes usually correspond to a single turn on a drum having a diameter of about 40 centimeters. The duration of a complete revolution of such a drum is in most cases of the order of 6 seconds, which corresponds to a speed of feeding of the tape of around twenty centimeters per second.

At the present state of the art, such a feeding speed results in a certain noise level which is detrimental to a satisfactory recording and reading of seismic data.

In order to increase the efficiency range of the recording, i.e. the ratio of the higher seismic signal to the background noise of the tape, the latter must be substantially reduced.

Such a result may be achieved by increasing the density, the fineness and the evenness of the grains of the tape whose surface is accordingly more continuous whereby the quality of the recorded signal is improved. However, such an increase of the density, the fineness and the evenness of the grains is subject to practical limits and it is therefore not possible to obtain a quite satisfactory recording.

Another method for improving the efficiency of the recording consists of increasing the moving speed of the magnetic tape, which corresponds to an increase of the density of the grains thereof within a given time interval. However, this speed increase may result in some deformations of the tape in the case of use of a large tape comprising numerous recording tracks as it is required for the seismic use, said deformations consisting for instance of a torsion of the tape or of an uneven moving speed resulting in further mechanical noises which disturb the reading of the recording. In order to avoid such deformations provision must be made for a proper guiding of the tape.

According to the guiding method which is the most generally used for recordings adapted to high moving speeds, the tape is maintained flat when passing between guide rollers which avoid any lateral displacement thereof. However, such a system is not well adapted to high moving speeds, particularly in the case of a wide tape.

There may also be employed a device of the type in use for the feeding of cinematographic films according to which the tape is caused to pass flat through a channel between guides and under pressing members. Such a device already achieves improvements as compared to the other devices used in the art, but does not avoid completely the risks of deformation of a wide tape.

It is therefore an object of this invention to provide a device which avoids these drawbacks and which is particularly adapted to high speed feeding of wide tapes particularly of the type comprising a large number of tracks.

It is another object of this invention to provide means for avoiding any deformation of a tape during the feeding thereof at high speed.

It is still another object of this invention to provide means for substantially reducing the strains to which a tape is subjected during the feeding thereof at high speed.

It is a further object of this invention to provide for a substantially constant moving speed of a tape in front of sensing heads.

These objects are achieved according to this invention by means of a double driving of the tape comprising both a two-stage control of the moving speed of the tape and a position control thereof. This two-stage control comprises a first control of the speed of two synchronized drive members having a tape loop therebetween which is pressed against a convex cylindrical arcuate surface or a drum by means of pressing rollers at least one of which is subjected to a second speed control.

In order to obtain an even and satisfactory driving of the tape it is however necessary to have the respective axes of the drum and of the pressing rollers strictly parallel to each other together with a certain smoothness of the tape driving mechanism.

Such a parallelism may be difficult to achieve particularly where the heretofore mentioned axes have to be subjected to displacements, for instance in view of a change of the magnetic tape on the drum.

It is therefore still a further object of this invention to provide means for avoiding the disadvantages resulting either from an unsatisfactory parallelism of said axes or from any unevenness of the drum surface as well as from any other defectiveness of the tape driving mechanism.

Such means essentially comprises a pressing roller actuated by means of a friction driving roller and supported by a fork-shaped member provided with a bidirectionally articulated stem. The friction driving roller may be selected of such a shape as to have only a relatively small friction surface with the pressing roller, whereby the moveability of the latter is not substantially reduced and accordingly the pressing roller may be kept in continuous contact with the drum surface or the film thereon during operation.

In accordance with preferred embodiments, this invention will be described more in detail with reference to the accompanying drawings, forming a part of this specification in which like numerals are employed to designate like parts throughout the same, and wherein FIGURE 1 schematically shows the assembly of a first embodiment of the device according to this invention, wherein the tape loop is pressed on a drum;

FIGURE 2 illustrates another embodiment wherein the tape loop is pressed on an arcuate cylindrical surface;

FIGURE 3 diagrammatically shows an arrangement of an articulated pressing roller associated with a drum for passing the tape loop thereon, in operative condition;

The operation of the device according to the invention will be described hereinafter with particular reference to FIGURE 1.

Figure 1:
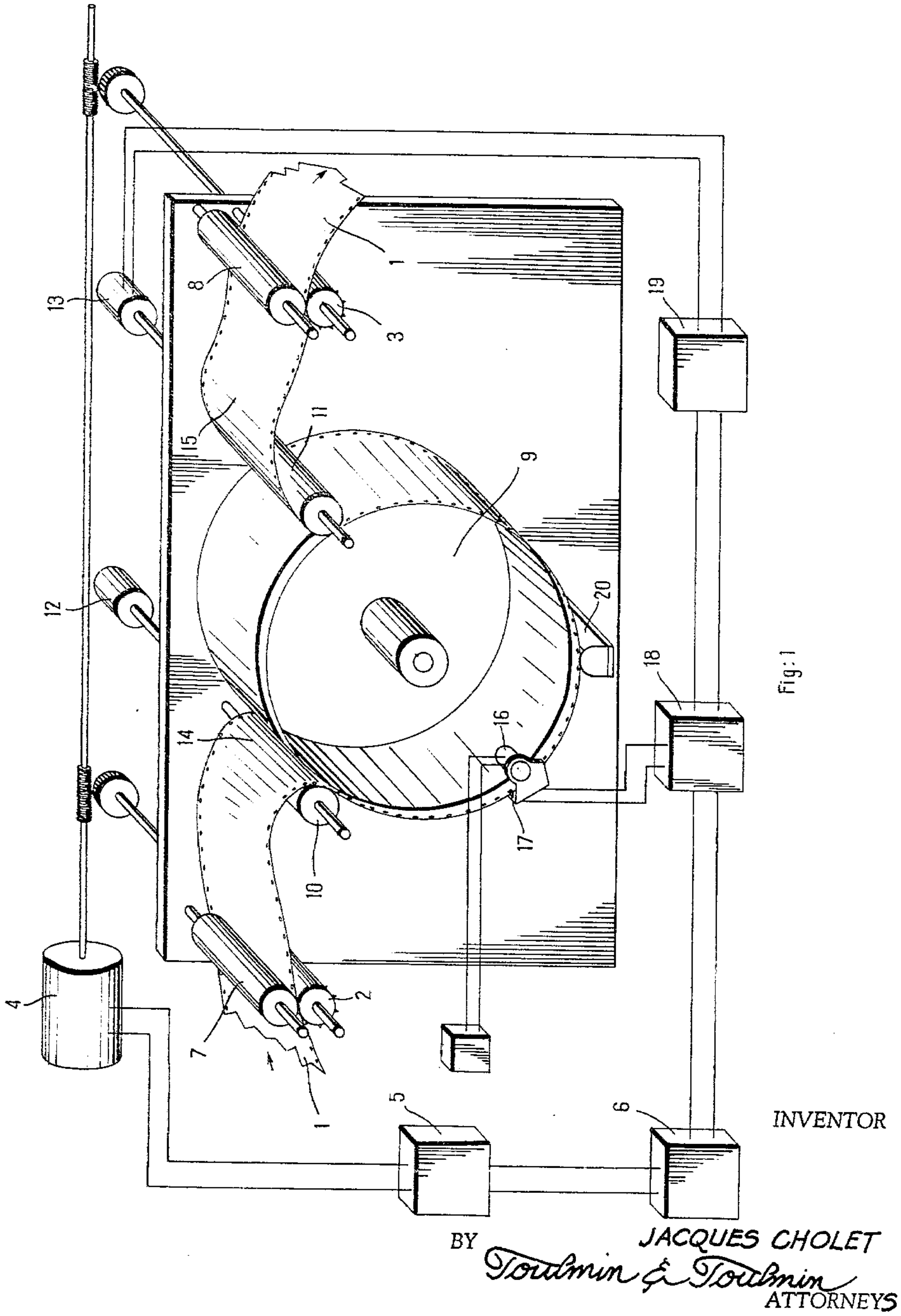

A wide magnetic tape 1 provided with lateral perforations, is driven at a high speed by means of sprocket driving members 2 and 3 in operative engagement with said lateral perforations, and actuated in synchronized revolutions by means of a motor 4, through convenient mechanical means such as chains or endless screws (as illustrated in FIGURE 1).

The speed of this motor 4 is adjusted, by means of an appropriate electronic device 5, to the frequency $f_0$ of a reference oscillator 6, said frequency being so selected as to correspond to the desired average lineal speed $V_0$ of the tape. The tape 1 is pressed against the sprocket driving members by means of pressing rollers 7 and 8.

The actual speed of the tape, as driven by this arrangement will be $V_0 \pm \epsilon v$, wherein $\epsilon v$ represents the speed variation due to the unevenness of the mechanical connections through chains or sprocket wheels and/or the sprockets of the driving members.

Between the two driving members 2 and 3, the tape 1 forms a loop which is partly wound on a drum 9 and pressed thereon by means of pressing rollers 10 and 11. The roller 11, driven by a motor 13, the revolving speed of which is varied so as to compensate for the speed variations of $\pm \epsilon v$, in turn drives, through the intermediary of the tape, the drum 9, freely rotatable about its axis, and the pressing roller 10. Accordingly, one part of the tape loop is strained on the surface of the drum whereas the portions thereof comprised between the sprocket driving members 2 and 3 and the pressing rollers 10 and 11, respectively, form two expanded loops 14 and 15. Accordingly, although it is driven at high speed, the tape is not subjected to the strains resulting from a too high tensile strength. The tape is therefore fed without deformation thereof, at an even speed $V_0$, the motor 13 being so controlled as to compensate for the speed variations of the tape attributable to the driving members 2 and 3, in the following manner: the lateral perforations of the tape portion pressed against the drum 9 pass in front of a light source 16 associated to a corresponding photoelectric cell 17.

According to a particular embodiment of this invention, the drum 9 may be comprised of a transparent material. In such a case the cell 17 and the light source 16 are oppositely located with respect to the transparent cylindrical surface of the drum.

During the feeding of the tape, the photoelectric cell 17 produces a series of pulses at a given frequency $f_0 \pm \epsilon f$ corresponding to a lineal speed $V_0 \pm \epsilon v$ of the lateral perforations of the tape. This series of pulses is supplied to a frequency comparator 18.

Separately, the reference oscillator 6 supplies a constant reference frequency $f_0$ to said frequency comparator 18. This comparator produces a signal which is proportional to the difference $\pm \epsilon f$ between the two compared frequencies. This signal is supplied to an electronic control device 19, controling the revolving speed of the motor 13, which, by slowing down or speeding up the latter compensates for the tape speed variations, thereby adjusting the speed to the desired value $V_0$.

Alternatively, the control device 19 may be used to control the brake 12 instead of the motor 13 which in this case is permanently driven at too high a speed, the regulation of the tape speed being achieved by means of the brake.

Accordingly the tape passes in front of a block of magnetic heads 20 at a speed $V_0$ an in such a manner that to a given time corresponds a given position of the tape, which position is identified by means of the lateral perforations used as a scale. The origin of this scale is defined either by means of a pulse recorded on the magnetic tape, or of a special perforation made on the tape side resulting in an optical signal which is read by means of a convenient cell. Accordingly the feeding of the tape is controlled not only in speed but also in position.

The control of the motors 4 and 13 may be achieved in various manners, by known means. By way of example there may be used as motor 4 a synchronous motor operated at the frequency $f_0$ supplied by the reference oscillator 6. In this case the device 5 may simply consist of an output amplifier.

The current feeding of the motor 13 is controlled by means of the device 19 comprising for instance an electronic switch, supplying current to the motor 13 when the signal issued from the frequency comparator 18 is negative, and switching off the current when said signal is positive.

Figure 2:
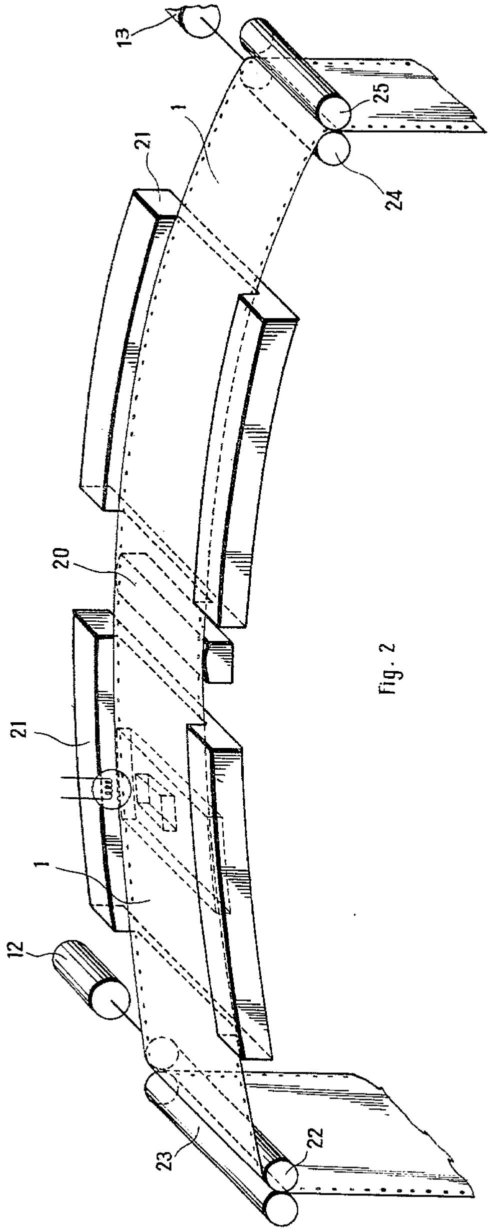

Another embodiment of a device for carrying out this invention is illustrated in FIGURE 2. According to this embodiment the drum 9 of FIGURE 1 is replaced by an arcuate channel 21 provided on two longitudinally convex surfaces placed along the same arc of circle and having therebetween a block of magnetic heads 20 for reading the tracks of the tape 1 which is driven flat on these surfaces through said channel. The tape driving system is similar to that illustrated in FIGURE 1 and is accordingly not shown in FIGURE 2.

Before the entrance of the channel 21 the tape passes between a capstan drive member 22 optionally of the pneumatic type and a pressing roller 23, said capstan 22 being controlled in rotation by means of the brake 12. At the outlet end of the channel, the magnetic tape passes between a capstan driving member 24 similar to 22 and a pressing roller 25. The capstan 24 is driven by means of a motor 13 controlled in the same manner as already described in connection with the embodiment shown in FIGURE 1.

A particular embodiment of pressing roller adapted for use in connection with the device comprising a drum is illustrated in FIGURES 3 to 6. As already stated such a device provides for a continuous contact of the tape with the drum surface even at high revolving speed of the latter, in spite of an imperfect parallelism between the drum axis and the pressing roller axis, and/or of uneveness of the drum surface.

Figure 3:
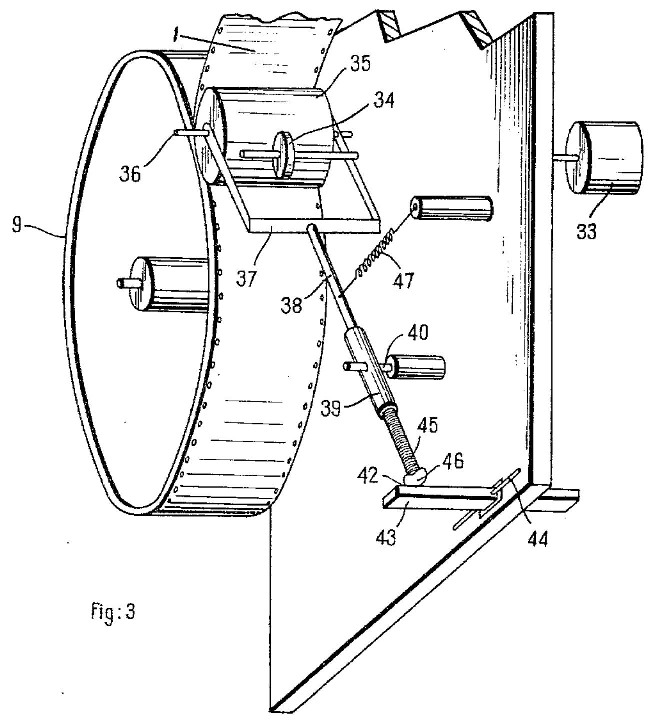
Figure 4:
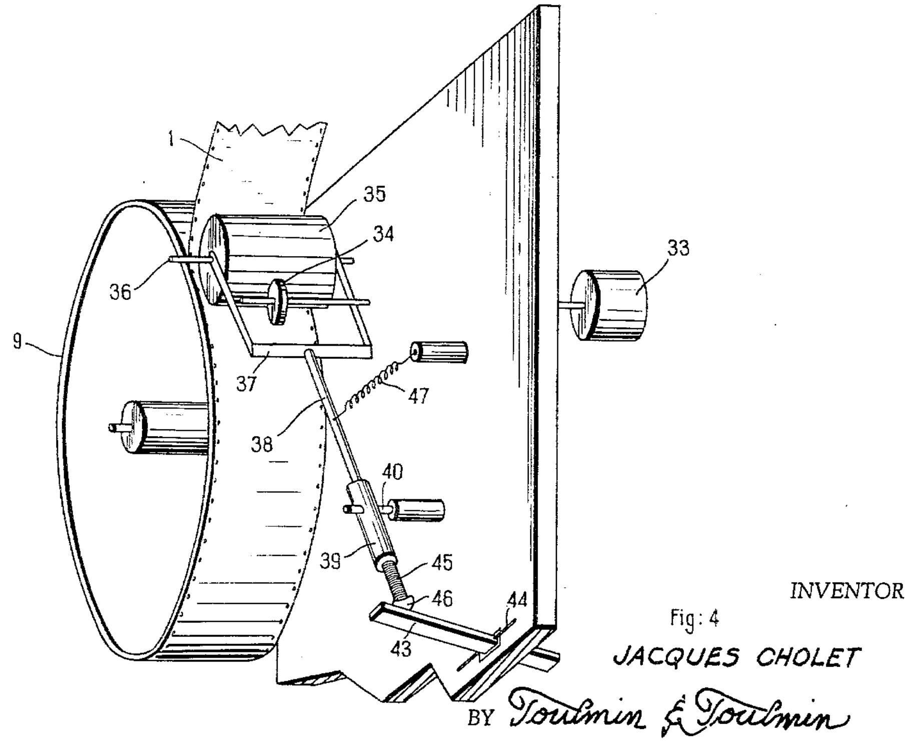
FIGURE 4 shows the same arrangement as in FIGURE 3 in non-operative condition.

This particular pressing roller together with the operation thereof will be described hereinafter with particular reference to FIGURES 3 and 4.

Figure 5:
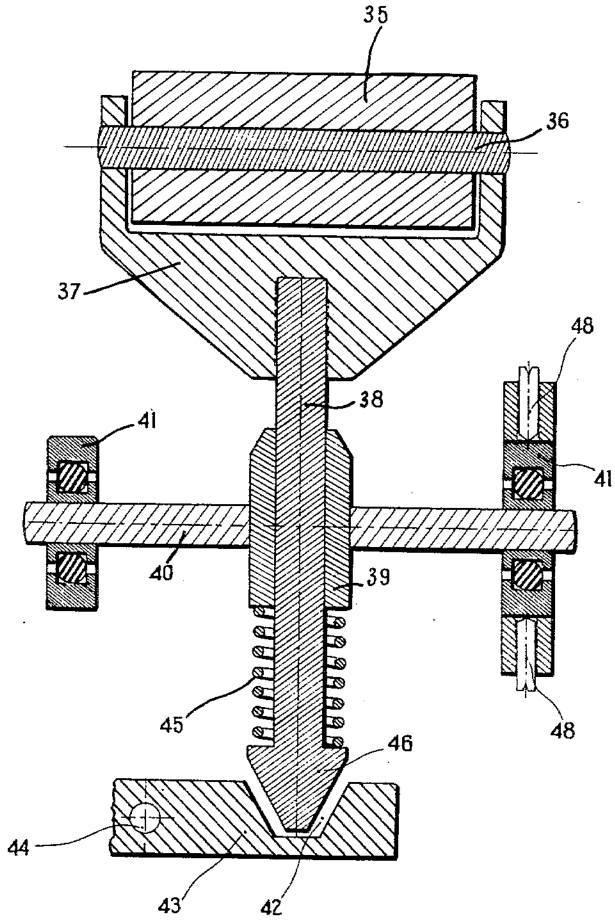
FIGURE 5 represents a longitudinal section of a first embodiment of pressing roller and its articulated support.

The drum 9, freely rotatable about its axis, supports the magnetic tape 1 which it is intended to displace in front of a magnetic head. Accordingly there is provided a motor 33 driving in rotation a friction roller 34. This friction roller is frictionally engaged with the pressing roller 35 which is adapted to press evenly on the drum surface and thereby to drive the drum 9 in rotation by frictional engagement with the tape applied thereon. The axis 36 of the pressing roller is secured on a fork-shaped member 37 having a stem 38 provided with bidirectionally articulating means consisting for instance of a tube 39 having the stem 38 slidably mounted therein, said tube being solid with a rod 40 pivotably mounted about its longitudinal axis, which is parallel to the axis 36 of the pressing roller, said rod being supported at both its ends on bearings 41 (FIGURE 5). The end part 46 of the stem 38 abuts without fixing means on a cup 42 of sufficient width to permit displacements of said end part during the pivoting about the rod 40. The stem 38 is also mounted freely pivotable about its longitudinal axis. The cup 42 is provided at one end of a lever 43 articulated on its shaft 44. When the lever 43 is so actuated as to cause its end 42 to move upwardly, the stem 38 slides into the tube 39 and a spring 45 placed between the lower end of the tube 39, and the end part 46 of the stem 38 is thereby compressed. This longitudinal displacement of the stem 38 results in an upward displacement of the pressing roller 35. The latter concomitantly moves apart from the drum 9 by pivoting about its axis 40 due to the action of the restoring spring 47 while still pressing on the friction roller 34 against which it is held in frictional contact during the whole operation. Its final position at this moment is that shown in FIGURE 4.

When the action on the lever 43 is stopped, the spring 45 is released and applies a downward traction force on the stem 38. At this moment, in view of the fact that the expanding force of the spring 45 is higher than the component of the same direction of the restoring force of the spring 47, the pressing roller 35, still bearing on the friction roller 34 is given a downward motion while simultaneously drawing nearer to the drum, until it is pressed on the latter. The friction roller 34 may be selected as being of such a shape that its circular contact surface with the pressing roller is relatively small, and placed substantially in the middle part of the latter with its end faces parallel to, and on both sides of a plane perpendicular to the drum axis and containing the axis of the stem 38. Due to this arrangement the pressing roller is kept substantially pivotable about the stem 38 and presses evenly on the drum surface.

In view of achieving a satisfactory feeding of the tape, the axis 36 of the pressing roller must be parallel to that of the drum 9. This parallelism may be adjusted by means of screws 48 (FIGURE 5) through which is effected the positioning of the bearings 41, whereby the axis 40, if slightly inclined with respect to the axis of the drum 9, may be restored to a position parallel to said axis.

At this moment the pressing roller 35 is in operative condition for securing a perfect feeding of the magnetic tape, even at high speed.

Figure 6:
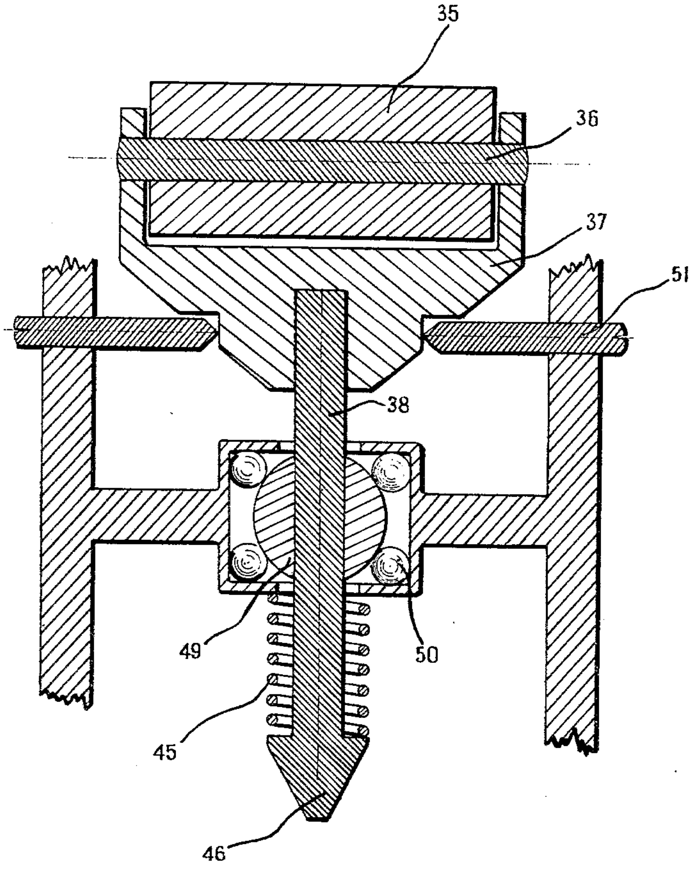
FIGURE 6 represents a longitudinal section of another embodiment of pressing roller and articulated support.

Another arrangement of the pressing roller and the support thereof is illustrated in FIGURE 6. It only differs from the arrangement shown in FIGURE 5 in that the bidirectional articulating means are replaced by multidirectional means. Said articulating means may comprise a sphere 49 freely pivotable in a corresponding recess and maintained in position by means of ball bearings 50, said sphere having locked thereto the stem 38 supporting the fork-shaped member 37. Accordingly the stem 38 is freely movable in all directions about the center of the sphere 49.

In this case the operation of the device is the same as hereabove described, in view of the cooperation therewith of adjustable abutment means 51 limiting the possible displacement of the fork-shaped member 37 to a rotation about an axis parallel to the axis 36 of the pressing roller 35. These abutment means are so adjusted as to secure the parallelism between the surface of the pressing roller and the cylindrical surface of the drum in contact therewith.

It will be understood that the above description and examples are intended to be illustrative only. Any modification of or variation therefrom which conforms to the spirit of the invention is intended to be included within the scope of the appended claims.

What is claimed as this invention is:

1. A device for high speed feeding of a wide magnetic tape between two driving sprockets and comprising a first electric motor operatively connected to the two sprockets for rotating them in synchronism, an oscillator connected to the motor for keeping it at constant speed, a freely rotatable cylindrical drum against the periphery of which a loop of the tape which is between the two sprockets is pressed, means including a roller for pressing one end of the loop against the drum, a variable speed motor for driving the roller, another roller for pressing the tape at the other end of the loop against the drum, and an adjustable brake for controlling the speed of rotation of said other roller.

2. A device for high speed feeding of a wide magnetic tape between two driving sprockets and comprising a first electric motor operatively connected to the two sprockets for rotating them in synchronism, means for controlling the speed of the first motor by comparison with a constant frequency of a reference oscillator, a freely rotatable cylindrical drum against the periphery of which a loop of the tape which is between the two sprockets is pressed, means including a roller for pressing one end of the loop against the drum, a variable speed motor for driving the roller, another roller for pressing the tape at the other end of the loop against the drum, an adjustable brake for controlling the speed of rotation of said other roller, means for producing an electric signal having a frequency which is proportional to the feeding speed of the tape loop pressed on said cylindrical surface, a frequency comparator providing a control signal which is proportional to the difference between said last-mentioned frequency and the constant frequency produced by the oscillator, and means for supplying said control signal to said second electric motor, thereby controlling the feeding speed of the tape loop and the positioning thereof with respect to the cylindrical surface.

3. A device for high speed feeding of a wide magnetic tape between two driving sprockets, said tape being provided with a series of equidistant optical reference marks, said device comprising a first electric motor operatively connected to the two sprockets for rotating them in synchronism, means for controlling the speed of the first motor by comparison with a constant frequency of a reference oscillator, a freely rotatable cylindrical drum against the periphery of which a loop of the tape which is between the two sprockets is pressed, means including a roller for pressing one end of the loop against the drum, a variable speed motor for driving the roller, another roller for pressing the tape at the other end of the loop against the drum, an adjustable brake for controlling the speed of rotation of said other roller, a photocell so associated with a source of light as to produce an electric pulse at each passage of one of said reference marks whereby the frequency of the pulses is proportional to the feeding speed of the tape loop that is pressed against the cylindrical surface, a frequency comparator providing a control signal which is proportional to the difference between said last-mentioned frequency and the constant frequency produced by the oscillator, and means for supplying said control signal to said second electric motor, thereby controlling the feeding speed of the tape loop and the positioning thereof with respect to the cylindrical surface.

4. A device according to claim 3, wherein the series of equidistant optical reference marks consists of lateral perforations in the tape which also permit driving of the tape by means of the sprockets.

References Cited by the Examiner

UNITED STATES PATENTS

| | | | |
|---|---|---|---|
| 1,939,113 | 12/33 | Ferris | 226—111 X |
| 2,348,862 | 5/44 | Sorkin | 226—28 |
| 2,491,228 | 12/49 | Swift | 226—36 |
| 3,019,301 | 1/62 | Aalund et al. | 179—100.2 |
| 3,031,118 | 4/62 | Frommer | 226—28 |

M. HENSON WOOD, JR., *Primary Examiner.*

ANDRES H. NIELSEN, ROBERT B. REEVES, *Examiners.*